United States Patent
Muenkel et al.

(10) Patent No.: US 8,979,964 B2
(45) Date of Patent: Mar. 17, 2015

(54) EFFICIENCY-IMPROVED MULTIPLE BELLOWS FILTER

(75) Inventors: Karlheinz Muenkel, Oberderdingen-Flehingen (DE); Markus Kolczyk, Mundelsheim (DE); Stefan Becker, Mannheim (DE); Michael Heim, Freiberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 310 days.

(21) Appl. No.: 12/228,093

(22) Filed: Feb. 26, 2009

(65) Prior Publication Data

US 2014/0053521 A1 Feb. 27, 2014

Related U.S. Application Data

(63) Continuation of application No. PCT/EP2009/052317, filed on Feb. 26, 2009.

(30) Foreign Application Priority Data

Feb. 26, 2008 (DE) .......................... 10 2008 011 186
Dec. 23, 2008 (DE) .......................... 10 2008 062 953

(51) Int. Cl.
*B01D 46/00* (2006.01)
*B01D 46/52* (2006.01)
*B01D 46/24* (2006.01)
*F02M 35/024* (2006.01)

(52) U.S. Cl.
CPC .......... *B01D 46/528* (2013.01); *B01D 46/0021* (2013.01); *B01D 46/2411* (2013.01); *B01D 46/522* (2013.01); *F02M 35/024* (2013.01)
USPC ................ 55/484; 55/385.3; 55/498; 55/521; 55/529; 210/342; 210/487; 210/493.2

(58) Field of Classification Search
USPC ................ 55/385.3, 482, 484, 498, 521, 529; 123/198 E; 210/342, 487, 493.2
See application file for complete search history.

(56) References Cited

U.S. PATENT DOCUMENTS

| 3,420,377 | A | * | 1/1969 | Vandersip ..................... 210/315 |
| 5,152,890 | A | | 10/1992 | Linnersten |
| 6,090,177 | A | * | 7/2000 | Moessinger et al. ............ 55/498 |
| 7,740,678 | B2 | * | 6/2010 | Gunderson et al. ............. 55/484 |
| 2004/0103626 | A1 | * | 6/2004 | Warth et al. ..................... 55/467 |
| 2005/0229561 | A1 | | 10/2005 | Nepsund et al. |

FOREIGN PATENT DOCUMENTS

| CN | 1658946 A | 8/2005 |
| CN | 1921922 A | 2/2007 |
| DE | 3805361 A1 * | 9/1988 |
| JP | 61-11397 U | 7/1986 |
| JP | 64-022863 U | 2/1989 |
| JP | 8-309137 A | 11/1996 |

* cited by examiner

*Primary Examiner* — Robert Clemente
(74) *Attorney, Agent, or Firm* — James Hasselbeck

(57) ABSTRACT

Filter element or air filter in the configuration of a multiple bellows filter with an increased efficiency for use in internal combustion engines, wherein a folded filter bellows is arranged radially inwardly of another folded filter bellows and the inner folded filter bellows has a greater or deeper fold depth than the outer folded filter bellows.

15 Claims, 5 Drawing Sheets

EFFICIENCY-IMPROVED MULTIPLE BELLOWS FILTER

CROSS REFERENCE TO RELATED APPLICATIONS

Priority is claimed based on Federal Republic of Germany patent application no. 102008011186.4 filed Feb. 26, 2008; and Federal Republic of Germany patent application no. 102008062953.7 filed Dec. 23, 2008. The present application is a Continuation of international patent application number PCT/EP2009/052317, filed Feb. 26, 2009 designating the United States of America, The entire disclosure of these three applications is incorporated herein by reference.

FIELD OF THE INVENTION

The invention concerns a filter element and an air filter and in particular a filter element and an air filter in the configuration of a multiple bellows filter with an increased efficiency for use in internal combustion engines.

BACKGROUND OF THE INVENTION

The combustion air required for internal combustion engines is generally filtered before being supplied to the combustion chamber in order to increase the efficiency and the service life of the internal combustion engine. For filtration of the combustion air generally an air filter arrangement is used. This is important in particular in connection with internal combustion engines that operate in an environment that is subject to special pollution loading of the ambient air, for example, in the field of the construction industry or agriculture. In particular in the field of the construction industry or in agriculture at times a very high dust loading occurs that requires filtering of the combustion air. Because of the fact that the spectrum of dust particle size generally is not known beforehand, an air filter arrangement must be designed such that all particle sizes that can interfere with the operation of the internal combustion engine in any way can be reliably filtered out in order to enable a supply of sufficiently clean combustion air to the internal combustion engine.

In particular in the field of internal combustion engines that are used in or on vehicles the configuration of an efficiency-optimized and space-optimized air filter system is mandatory in order to keep the dimensions small and in order to still enable a high efficiency of the air filter arrangement, on the other hand.

For example, EP 1 364 695 A1 discloses an air filter that is integrated into the intake manifold of an internal combustion engine in order to subject the combustion air to be supplied to the cylinders of the internal combustion air to a filtration action. The air filter is substantially of a three-par configuration and comprises a filter element in a filter housing which filter element is configured as an exchangeable filter cartridge through which combustion air flows axially and that is insertable radially by means of a closable lid into the filter housing. The filter cartridge has arranged upstream thereof a cyclone preseparator that serves for separation of large dirt particles. Downstream of the filter cartridge there is a secondary or fine filter element that also is insertable radially into the filter housing when the lid is open. The cyclone preseparator, the filter cartridge, and the fine filter element are positioned axially sequentially behind one another and the combustion air to be filtered passes through them without deflection in the axial direction.

One of these possibilities is the configuration of the main filter element in the form of a folded bellows filter. For example, a folded bellows can be comprised of a star-shaped folded filter element whose filter folds extend in radial direction wherein the front edges of the filter folds extend substantially in an axial direction. Such a folded bellows filter is disclosed, for example, in WO 2008/067030 in which the filter element is comprised of a folded filter bellows wherein the front edges of the filter folds extend in the axial direction that corresponds to the direction of flow while the filter folds extend in a direction transverse thereto. This folded bellows is comprised of a multiple folded bellows that provides on a limited axial section or on a section in the flow direction an increased filter surface area in order to increase in this way the filtering capacity.

SUMMARY OF THE INVENTION

In view of this background of the prior art, the present invention has the object to provide a filter element and an air filter for internal combustion engines that has an improved efficiency and enables optimized flow.

The object of the present invention is solved by the subject matter of the independent claims wherein further embodiments are disclosed in the dependent claims.

According to an exemplary embodiment of the invention a filter element for an air filter of an internal combustion engine is provided wherein the filter element comprises a first filter bellows with filter folds that extend substantially in an axial expansion direction of the filter element and a first fold depth extending substantially in a plane that extends orthogonally thereto in the radial expansion direction and a second filter bellows with filter folds that extend substantially in an axial expansion direction of the filter element and a second fold depth extending substantially in a plane that extends orthogonally thereto in the radial expansion direction, wherein the second filter bellows is arranged radially inwardly relative to the first filter bellows, wherein a depth of the second filter folds is deeper than a depth of the corresponding first filter folds.

In this way, a filter element in the form of a multiple bellows filter can be provided that has an increased efficiency and at the same time enables optimized flow of the combustion air to be filtered. Because of the fact that the second filter bellows is arranged radially inwardly relative to the first filter bellows, for a circular or oval configuration of the filter bellows, for example, in the form of a star-shaped filter bellows, the circumference of the first outwardly positioned filter bellows is in general greater than the circumference of the second inwardly positioned filter bellows. This means accordingly that the filter folds of the first and of the second filter bellows that correspond to one another are substantially positioned opposite one another. As a result of the different circumferences of the filter bellows it is possible to provide along the circumference a greater number of filter folds on the first filter bellows in comparison to the second filter bellows. Accordingly, generally the first filter bellows will have a greater number of filter folds than the second filter bellows. In order to approximate the loading of the filter surface area of the two filter bellows relative to one another, the depth of the filter folds of the second inner filter bellows is designed to be deeper than the depth of the corresponding filter folds of the first outer filter bellows. Because of this different configuration the filter surface area of the inner second filter bellows can be enlarged in order to compensate in this way the greater circumference of the first filter bellows. In this way, it can be achieved that the first filter bellows and the second filter bellows are more uniformly flown through in order to increase in this way the efficiency of the filter element.

It should be noted in this context that a filter element in the form of a multiple bellows filter may of course comprises more than two radially nested filter bellows wherein in particular in case of a larger number of radially nested filter bellows a uniform flow through the filter element can be achieved by means of an increasing fold depth for the farther inwardly positioned filter bellows. Moreover, it should be noted in this context that the fold depth along the circumference of a filter element can change, for example, in order to accommodate an external geometric specification so that there may be areas along the circumference that have a greater fold depth than other areas along the same circumference. In such cases it may happen that the second inner folded bellows has filter folds that have a smaller depth than the filter folds of the first filter bellows when they are not positioned opposite one another and therefore are not corresponding to one another.

According to a further exemplary embodiment of the invention the depth of the second filter folds is deeper by the factor 1.1 to 2.5, in particular by the factor of substantially 1.2 to 1.9, than the depth of the corresponding first filter folds.

It has been found that in particular for a difference of the filter fold depth by the factor 1.1 to 2.5, in particular by the factor of substantially 1.2 to 1.9, an excellent approximation of the filtering efficiency of the first filter bellows and the second filter bellows results with regard to the aspect of a uniform flow of the first filter bellows and the second filter bellows and the space that is available.

According to an exemplary embodiment of the invention the filter folds of the second filter bellows relative to the filter folds of the first filter bellows are at least section-wise slanted relative to an axial expansion direction.

By slanting the filter folds, they can be made longer as a result of a certain diagonal component so that the effective filtering surface area of the second filter bellows relative to the first filter bellows is not only increased relatively by the increased fold depth but also an increased fold length is provided as a result of the slant. In this way, the effective filtering surface area of the second filter bellows relative to the first filter bellows can be increased. Moreover, as a result of the slanted positioning of the folds of the inwardly positioned filter bellows a conical intake or conical outflow passage can be provided that has in the intake area of the intake passage a greater cross-sectional surface area than in deeper areas of the intake passage. In analogy, the outflow passage in the area of the outlet mouth can have a greater cross-sectional surface area while the outflow passage in deeper areas has a smaller cross-sectional surface area. In other words, by a slanted configuration of the inner filter bellows where the intake passage is wide the outflow passage positioned at the other side of the corresponding filter bellows can be configured to be narrow while in areas where the intake passage is narrow the outflow passage can be configured to be wide. In this way, the radial expansion of the folded bellows filter arrangement can be designed to be more compact.

According to an exemplary embodiment of the invention, a slant of the filter folds of the second filter bellows relative to the axial expansion direction is greater than a slant of the filter folds of the first filter bellows relative to the axial expansion direction.

It is understood in this context that the outer first filter bellows may also extend substantially parallel to the axial expansion direction, i.e., it has a slant of substantially zero degrees. However, the first filter bellows as well as the second filter bellows may have a slant wherein, however, the slant of the second filter bellows is greater than that of the first filter bellows in order to enable in this way an increased surface area at the second filter bellows as well as a conical configuration of the intake and outflow passages by means of the slanted positioning.

According to an exemplary embodiment of the invention, the first filter bellows is provided at a first axial end with a shell that relative to an outer edge 13 of the first filter bellows is shape-preserving.

In this way, the shape stability of the filter element can be ensured so that, even for an accidental force exertion or impact on the outer edge, the outer edge substantially maintains its shape so that the filter folds of the folded bellows will not deform, buckle or even tear. The shape-preserving shell can be provided additionally with a sealing configuration that can serve for a seal-tight introduction of the filter element into the air filter housing. Moreover, the shape-preserving shell can have grip elements by means of which the filter element can be inserted into the air filter housing or removed therefrom safely with regard to handling. This is important in particular when the insertion or removal of the filter element is performed by personnel of little skill who are often not aware of the sensitivity and function of a filter element. Moreover, the shape-preserving shell can also have an configuration that enables improved flow of the air to be filtered to the intake passages, for example, in the form of air baffles or another flow optimized geometry.

According to an exemplary embodiment of the invention, the first filter bellows has in a plane of the radial expansion direction a first curved section and a second curved section with a first substantially straight section and a second substantially straight section intermediately positioned, respectively, in such a way that the first and the second curved section as well as the first and the second substantially straight section form a closed oval circumferential contour. In this way, the filter element can be designed to be narrow so that it has a long axis and a short axis wherein, for example, the filter element may be inserted into the air filter housing in the direction of the long axis. In this way, the actual lid opening for closing off the air filter housing after changing the air filter can be designed to be relatively small. This is of particular importance with regard to the aspect of the sealing geometry. It is to be understood that the substantially straight sections may also have a certain curvature and that this embodiment is to be interpreted to include embodiments in which the curved sections have a substantially greater curvature than the substantially straight sections regardless of the fact whether the substantially straight sections are indeed straight or have a certain curvature.

According to an exemplary embodiment of the invention, the first and second substantially straight sections extend toward one another in the plane of the radial expansion direction.

In this way, a radial cross-section of a filter element results that is similar to a pear shape so that upon insertion of the air filter element into an air filter housing with the narrow end leading an improved sealing action can be achieved because the slantedly extending substantially straight sections will undergo a sealing connection under a force load only shortly before reaching the terminal position so that in particular during insertion of the air filter element long dragging movements of two sealing surfaces on one another are substantially avoided. This is important in particular in dust-laden environments so that the sealing surfaces are significantly less loaded and in particular are substantially force-loaded in the sealing direction for which it is designed.

According to an exemplary embodiment of the invention, the second filter bellows has in a plane of the radial expansion direction a first curved section and a second curved section with a first substantially straight section and a second substantially straight section intermediately positioned, respectively, such that the first and the second curved section as well as the first and the second substantially straight section form a closed oval circumferential contour.

In this way, the inner folded bellows matches with regard to its shape the shape of the outer folded bellows. In this way, a flow-optimized geometry and a flow-optimized intake passage can be provided that results from the intermediate space between the first filter bellows and the second filter bellows and that can also constitute a closed oval circumferential contour.

According to an exemplary embodiment of the invention, at a first axial end of the second filter bellows the first straight section and the second straight section are connected to one another by means of a first sealing element in such a way that a filtered gas side and an unfiltered gas side of the second filter bellows are separated from one another in a leakage-proof fashion.

In particular in a configuration of the second filter bellows in the form of an oval circumferential contour, the oppositely positioned, substantially straight sections can be connected to one another by a sealing bead so that at the second axial end opposite the first axial end an intake passage or outflow passage is formed extending conically in the direction of the first axial end. In particular for an oval circumferential contour of the second filter bellows, a significant deformation and thus shear strain onto the filter folds can be substantially prevented so that in particular during manufacture the risk of damaging the filter folds can be reduced.

According to an exemplary embodiment of the invention, the first sealing element extends in a plane of the radial expansion direction only partially across the depth of the second filter folds of the second filter bellows.

In particular when the second filter folds of the second filter bellows are alternatingly provided with an adhesive connection in order to separate a filtered gas side from an unfiltered gas side, by means of an only partial covering of the filter folds by the first sealing element the area between the filter folds can remain open so that the effective intake passage area or outflow passage area of an intake passage or outflow passage can be increased. In this connection, the sealing element can take on substantially only the sealing action of the two substantially straight sections that are positioned opposite one another in the oval shape while in the filter folds for separation of the unfiltered gas side from the filtered gas side a bead-shaped adhesive connection is provided that adjoins, for example, the first sealing element.

According to an exemplary embodiment of the invention, the first filter bellows and the second filter bellows are connected at the second axial end, respectively, with one another by a second sealing element in such a way that the filtered gas side and the unfiltered gas side of the first filter bellows and the second filter bellows are separated from one another in a leakage-proof way.

Accordingly, the first filter bellows and the second filter bellows can be connected seal-tightly with another. In this connection, the second sealing element can also be designed as an edge protection device when the second sealing element extends to the outer contour of the second axial end of the first filter bellows.

According to an exemplary embodiment of the invention, the second sealing element extends in a plane of the radiant expansion direction only partially across the depth of the first filter folds and the second filter folds.

In this way, the second sealing element can be designed to be relatively narrow and for an adhesive connection of the first filter folds and the second filter folds by a bead-shaped adhesive connection, the corresponding oppositely positioned sides of the filter folds can remain open so that an increase of the effective intake or outflow surface areas of an intake or outflow passage results. In this connection, it is not to be excluded that at the outer contour of the second axial end of the first filter bellows an edge or impact protection is provided that, for example, can be designed as a shape-preserving shell but can also be made from the same material as the second sealing element; this can be particularly important with respect to optimizing aspects of a production process.

According to an exemplary embodiment of the invention, the sealing element comprises a polyurethane foam or other suitable materials for a seal (for example, foams of silicone or potting compounds, for example, polyamide or polyurethane).

Polyurethane foams can be relatively easily handled and cure quickly; they have however the desirable properties that are suitable for a sealing function but also for an edge protection function. The sealing elements comprising polyurethane (PUR) foam can be the first sealing element as well as the second sealing element but also other sealing elements. Moreover, the bead-shaped adhesive connection can also be realized with polyurethane foam-comprising sealing material.

According to an exemplary embodiment of the invention, a filtered gas side of the first filter bellows is facing a filtered gas side of the second filter bellows.

Accordingly, the intake side and thus the unfiltered gas side has two intake passages, i.e., an outer intake passage that is defined by the outer wall surface of the filter element and a second inner intake passage extending coaxially thereto and defined by the unfiltered gas side of the second filter element. In an arrangement with more than two radially nested filter elements, correspondingly more intake or outflow passages are formed in this way. Such a configuration with two intake passages at the unfiltered gas side and an outflow passage at the filtered gas side with a filter element in an embodiment with two filter bellows can in this way provide an optimized intake flow at the intake side, for example, by a cyclone arrangement that is oriented toward the corresponding intake passages. In analogy, at the outflow passage side a corresponding arrangement of a safety element can be provided. In such an arrangement where a filtered gas side of the first filter bellows is facing a filtered gas side of the second filter bellows, the sealing action of the filter element relative to the air filter housing can be provided at a greater distance to the preseparator so that loading of the sealing arrangement by the incoming flow of the preseparator can be reduced. In particular, in such a configuration the outflow passage of the air filter housing can be provided with a smaller cross-sectional surface area than the intake passage of the air filter housing because the outflow passage in contrast to the intake passage during its service life is not geometrically constricted by the filtrate.

According to an exemplary embodiment of the invention, the filter element has a third filter bellows wherein the second filter bellows and the third filter bellows are designed substantially round in the radial expansion direction wherein the second filter bellows and the third filter bellows are positioned adjacent to one another and radially inwardly within the first filter bellows.

In such a configuration corresponding filtered gas sides and unfiltered gas sides of the second and third filter bellows, respectively, are positioned opposite the sides of the first filter bellows. The second filter bellows and the third filter bellows take over the same function in this connection. With such a configuration the second filter bellows in the third filter bellows together can have a filter surface area that is almost as large as that of the first filter bellows so that a homogenous flow through the filter bellows can be achieved. Of course, the second and third filter bellows can also have a shape deviating from a round shape, for example, an oval shape.

According to an exemplary embodiment of the invention the first filter bellows, on the one hand, and the second filter bellows and the third filter bellows, on the other hand, are connected by a third sealing element at the second axial end, respectively, in such a way that the filtered gas sides and the unfiltered gas sides of the first filter bellows and of the second filter bellows and of the third filter bellows are separated from another in a leakage-proof way.

The third sealing element can take over in addition to the actual sealing function also an edge protection function in particular when it extends across the entire filter fold depth of the outer first filter element. The third sealing element however can also extends only partially across the filter fold depth of the first filter element and the second and third filter elements so that the corresponding intermediate spaces between the folds are available as an intake surface area.

According to an exemplary embodiment of the invention, the first filter bellows has a first unfiltered gas side and a first filtered gas side and the second filter bellows has a second unfiltered gas side and a second filtered gas side, wherein the first filter bellows and the second filter bellows are connected to one another at an end face of the first filter bellows and an end face of the second filter bellows so as to be leakage-proof such that either a first unfiltered gas side space corresponds to a second unfiltered gas side space or a first filtered gas side space corresponds to a second filtered gas side space.

It is understood that also a combination of the afore described features is possible whereby partially a synergistic interaction can be produced that surpasses the sum of individual effects of the aforementioned features.

In the following, exemplary embodiments of the invention will be disclosed and explained with the aid of the attached drawings.

The embodiments disclosed in the following are not to be understood as limiting in any way and show expedient but not exclusive embodiments of the present invention.

DESCRIPTION OF EXEMPLARY EMBODIMENTS OF THE INVENTION

Figure 1:
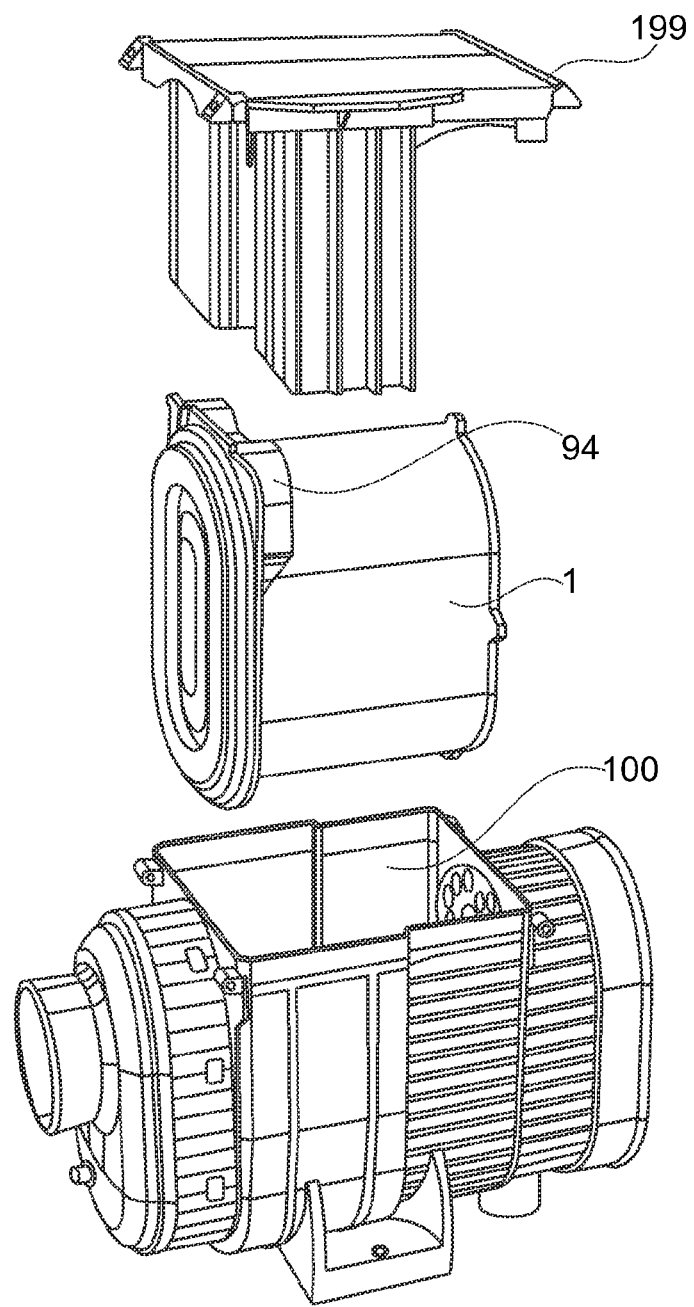
FIG. 1 shows a schematic arrangement of an air filter housing with a filter element to be inserted and a lid element.

FIG. 1 shows a schematic illustration of an air filter housing 100 with a filter element 1 inserted therein as well as a closure and securing lid 199. The air filter housing 100 may comprise in addition to the filter element 1 that is designed here as a main filter element, also a prefiltering element as well as a safety filtering element. In the illustrated embodiment the filter element 1 is inserted in a direction orthogonal to the flow direction into the filter housing. By means of an appropriate geometry on the closure element 199 the filter element 1 inserted into the filter housing 100 can be pressed, for example, seal-tightly against a corresponding sealing surface in the filter housing 1. The force loading can be realized substantially in the axial direction corresponding to the flow direction. Moreover, embodiments are conceivable also in which the filter element 1 has a sealing configuration which requires substantially a radial force loading so that by means of the closure element 199 a pressing force must not mandatorily be performed in the axial direction. The closure element 199 however can also be provided with a corresponding sealing contact surface for the filter element 1. Moreover, the closure element 199 can expediently have a sealing configuration with which the air filter housing 100 can be seal-tightly closed when the filter element 1 is inserted. In this connection, the filter element 1, as shown in FIG. 1, can have a grip 94 with which the filter element can be inserted into the air filter housing 100 as well as removed therefrom. Such grips 94 are designed expediently such that they can be found effortlessly when no eye contact between an operating person and the filter element exits or the operating person possibly wears protective gloves.

Figure 2:
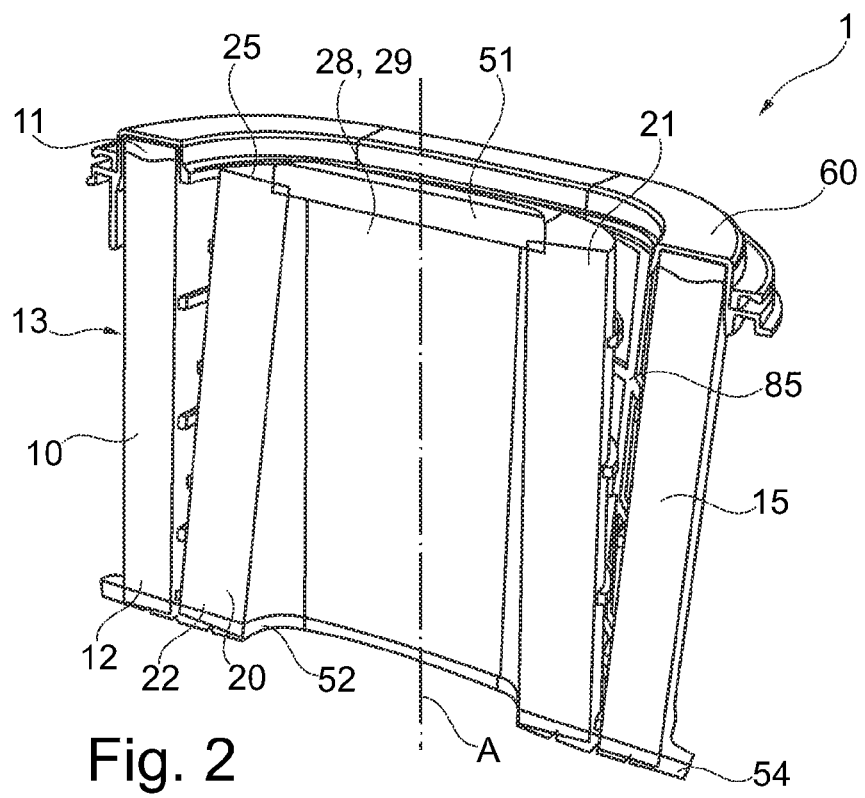
FIG. 2 shows a section view of a filter element according to an exemplary embodiment of the invention.

FIG. 2 shows a schematic section illustration of a filter element according to an exemplary embodiment of the invention. The section of the filter element is taken in the axial expansion direction A, in particular along a longest expansion in the radial expansion plane. In this connection, the filter element 1 is provided with a first filter bellows 10 and a second filter bellows 20. The second filter bellows 20 is positioned radially inwardly of the first filter bellows 10. The first filter bellows 10 has filter folds 15 that have a first fold depth extending substantially in a plane that is orthogonal to the axial direction in the radial expansion direction. In analogy, the second filter bellows 20 has filter folds 25 that extend in a plane that is substantially orthogonal to the axial expansion direction in the radial expansion direction. In this connection, the first filter bellows 10 and the second filter bellows 20 are folded like a star-shaped filter. The second filter bellows 20 has a greater fold depth in comparison to the first filter bellows 10. In this way, the effective filter surface area of the inwardly positioned second filter bellows 20 can be increased. The following table shows a selection of possible configurations that a filtering device according to the invention can be provided with.

| filter type | volume flow [m³/min] | fold depth internal [mm] | fold depth external [mm] | ratio internal/ external | width [mm] | height [mm] | length [mm] | number of folds internal | number of folds external | filter surface area inner bellows [m²] | filter surface area outer bellows [m²] |
|---|---|---|---|---|---|---|---|---|---|---|---|
| F1 | 4.5 | 25 | 14 | 1.79 | 200 | 95 | 170 | 122 | 223 | 0.9 | 1.01 |
| F2 | 7.4 | 25 | 20 | 1.25 | 201 | 134 | 166 | 112 | 225 | 0.85 | 1.4 |
| F3 | 7 | 28 | 20 | 1.40 | 234 | 140 | 164 | 127 | 259 | 1.11 | 1.66 |
| F4 | 10 | 36 | 25 | 1.44 | 239 | 172 | 195 | 103 | 270 | 1.45 | 2.67 |
| F5 | 14 | 48 | 25 | 1.92 | 264 | 197 | 195 | 117 | 311 | 2.1 | 2.92 |

In the embodiment illustrated here the first folded bellows 10 is provided at its first axial end 11 with a shape-stable cover 60. This shape-stable cover, as shown in FIG. 2, can extend across the entire fold depth of the first folded bellows 10. However, this shape-preserving shell can also extend only over portions of the first fold depth of the folded bellows 10 and can leave the folds uncovered, for example, at the radially inwardly positioned area opposite to the folds of the second folded bellows 20 in a flow direction. In the latter case, the effective flow surface area in a passage that is formed by the first folded bellows 10 and the second folded bellows 20 is increased. The shape-preserving shell 60 can be, for example, comprised of relatively hard plastic material but can also be comprised of metal or another shape-stable material. The shape-stable shell 60 can be, for example, seal-tightly attached by gluing by means of polyurethane (PUR) foam. Moreover, a sealing configuration can be arranged also on the shape-preserving shell 60 with which the filter element can be sealed relative to an air filter housing so that an unfiltered gas side and a filtered gas side of the filter element are separated from one another in a leakage-proof way. The sealing configuration provided in this connection can be an are axially sealing seal as well as a radially sealing seal. The embodiment illustrated in FIG. 2 shows a circumferentially extending sealing groove into which a corresponding sealing geometry of an air filter housing or an air filter housing lid can be inserted.

The first filter bellows as well as the second filter bellows can have a curved first section 16, 26 and a curved second section 17, 27 as well as an intermediately positioned first substantially straight section 18, 28 and a second substantially straight section 19, 29 as will be explained in the following with reference to FIG. 3.

The substantially straight sections 28, 29 of the second folded bellows can be seal-tightly connected to one another by means of a sealing element 51 such that a filtered gas side and an unfiltered gas side are separated from another in a leakage-proof way. The sealing element 51, for example, can extend only partially across the filter folds 25 of the second filter bellows. The folds can then be glued or closed off at one side so that even for only a partial coverage of the fold depth by the sealing element a separation of the unfiltered gas side and the filtered gas side is achieved. The adhesive connection is then arranged on the side that is facing the sealing element. This can be done for each filter bellows such that only at one axial end face the front edges of the filter folds are tacked while the front edges of the filter folds at the opposite end face are covered by a cover element, for example, in the form of a shape-stable shell. Relative to the two filter bellows tacking of the end faces of the filter folds and of the cover is done alternatingly so that, for example, on the radially outwardly positioned filter bellows the front edges are glued and on the oppositely positioned axial end face are covered by a cover ring and at the radially inwardly positioned filter bellows the axial intake side is covered by a cover disk. The front edges on the oppositely positioned axial outflow side are can be tacked or glued together. By tacking or gluing the front edges, in the axial direction there are flow spaces or passages formed that extend in the axial direction wherein in connection with the cover element it is ensured that the fluid that is supplied flows through the filter wall in the radial direction.

However, it is also conceivable that the sealing element 51 extends across the entire fold depth of the filter folds 25. In this way, an increased impact protection is enabled, in particular for the exposed corners of the filter folds 25, but the effective intake or outflow surface area of the intake or outflow passage which is formed between the first filter bellows 10 and the second filter bellows 20 is reduced.

Moreover, a second sealing element 52 can be provided that connects seal-tightly a second axial end 12 of the first filter bellows 10 and a second axial end 22 of the second filter bellows 20 so that a filtered gas side and an unfiltered gas side are separated from one another.

It should be noted that a flow can pass through the filter element illustrated in FIG. 2 from the first axial end 11, 21 as well as from the second axial end 12, 22. The appropriate mounting direction in an air filter is derived from the corresponding requirements and the external circumstances.

The second filter bellows 20 can be slanted relative to the first filter bellows 10. In this connection, as shown in FIG. 2, the first filter bellows 10 can extend substantially parallel to an axial expansion direction A while the second filter bellows 20 is slanted relative to the axial expansion direction A. As a result of this slant, on the one hand, the effective filter surface area of the second filter bellows 20 can increase because of the diagonal and, on the other hand, a conically extending intake or outflow passage can be provided that is formed between the second filter bellows 20 as well as between the inner surfaces of the inner filter bellows 20. In one embodiment, the radially outwardly positioned filter bellows is cylindrical wherein its outer diameter and its inner diameter do not change across the axial length. Instead of this cylindrical embodiment in an alternative embodiment with respect to the constructive requirements of the filter housing 100 a conical design can also be provided at the outer diameter so that when mounting the filter element 1 in the filter housing 100 an additional space in the interior of the filter housing is formed because of the continuously decreasing outer diameter that in an advantageous way affects the outflow of the purified fluid and minimizes the flow velocity as well as the noise caused by it. The radially inwardly positioned one of the filter bellows 20 can also have a conical shape in this connection wherein the conical shape tapers from the intake sides to the outflow side. In this way, a flow space between the filter bellows 10, 20 in the form of an annular cone is produced that widens toward the outflow side and opens at an outflow opening. This is important with regard to fluidic aspects relative to the removal of the filtered air or the filtered fluid. Across the axial length the flow space thus has a changing cross-section wherein the rate of change in the axial direction is substantially constant.

Basically, a varying rate of change across the axial length is possible also. Moreover, the flow space can also have a uniform cross-section which is the case when the inner side of the outer filter bellows and the outer side of the inner filter bellows extend concentrically relative one another, i.e., no conicities or matching slants are provided on them. When, for example, the outwardly positioned one of the two filter bellows has a constant inner diameter while the outer wall surface of the radially inwardly positioned filter bellows 20 is conical, a conically extending annular space is created. This annular space opens at the outflow side in an outlet opening. In this annular space a support frame 85 can be inserted which surrounds the flow space between the filter bellows. In particular for large volume filter devices whose filter elements have a corresponding greater weight this support frame, for example, manufactured as an injection-molded part or made of metal, increases the stability. This support frame 85 can be provided with ribs that extend in the axial direction as well as in the radial direction and by means of which in particular large volume filter bellows can be kept apart from one another so that the conically extending flow space between them maintains a constant appearance with regard to its geometry. The support frame provides the required mechanical stability by a supporting action. The support frame can be, for example, of a monolithic configuration. The first radially outwardly positioned filter bellows 10 as well as the second radially inwardly positioned filter bellows 20 are substantially flown through in the radial direction.

Such a conical shape, on the one hand, can be stabilized in that the slant and the position of the second filter bellows relative to the first filter bellows are secured by the sealing elements 52 and 51 or the shape-preserving shell 60. Alternatively or as a supplement, the stability can be provided by a cage or a frame 85 that preserves the shape stability of the two filter bellows relative to one another. In particular during the manufacturing process of the filter element, upon application of the sealing element 51 and 52 the shape-preserving frame 85 can maintain the filter bellows in position such that a problem-free application of the sealing elements 51 and 52 is enabled.

Figure 3:
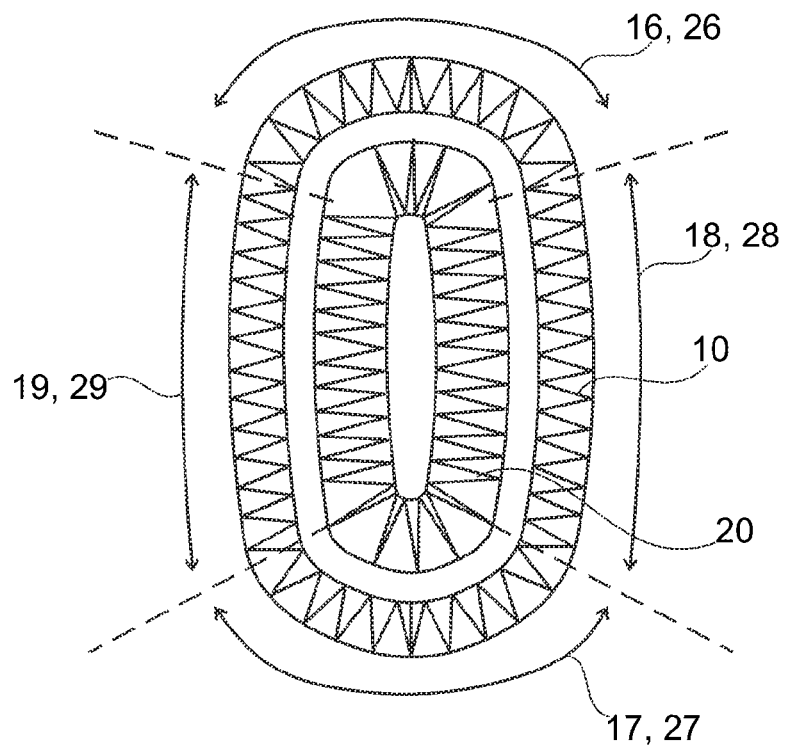
FIG. 3 shows a section orthogonal to an axial expansion direction of a filter element according to an exemplary embodiment of the invention.

FIG. 3 shows a section view extending orthogonally to the axial expansion direction A, as is illustrated in FIG. 2. The section view illustrated in FIG. 3 shows the filter element having a substantially oval shape with curved and substantially straight sections. The filter bellows 10 as well as the filter bellows 20 have in this connection a first substantially curved section 16, 26 as well as a second substantially curved section 17, 27 as well as a first substantially straight section 18, 28 as well as a second substantially straight section 19, 29. It should be noted in this context that the substantially straight sections 18, 28, 19, 29 can also have a curvature which is however substantially less than the curvature of the curved sections 16, 26, 17, 27. The curved sections pass in this connection substantially without a sharp bend into the substantially straight sections so that a substantially oval or even elliptical cross-sectional shape of the filter element is provided. In this way, the filter element can be of a narrow configuration and a corresponding opening in an air filter housing can be designed to be more narrow than in case of a filter element with a comparable filtering efficiency having, for example, a circular cross-section.

Figure 4:
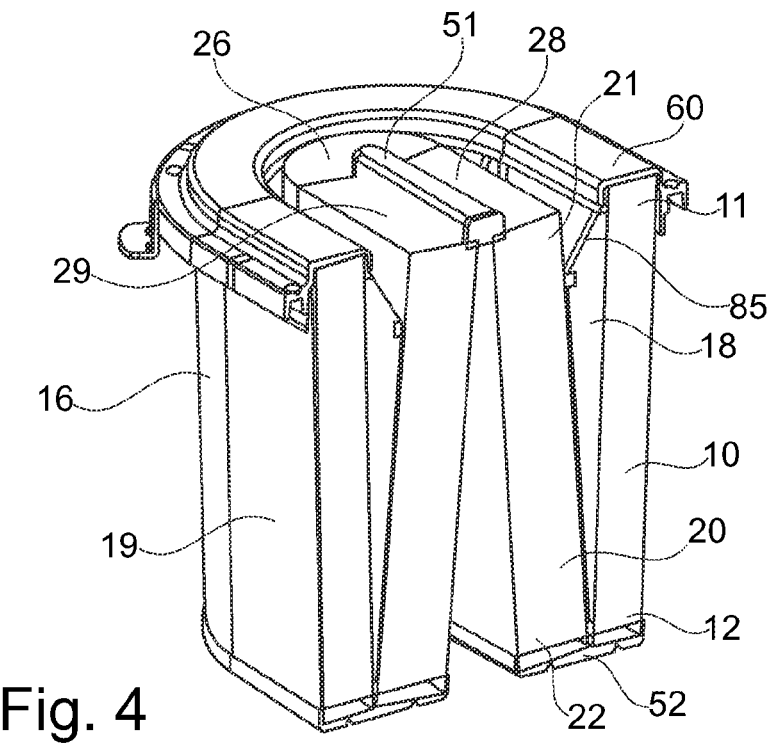
FIG. 4 shows a section orthogonal to the section illustrated in FIG. 2 in an axial expansion direction.

FIG. 4 shows the structural configuration of a filter element according to an exemplary embodiment of the invention. In this connection, the outer first filter bellows 10 has a first curved section 16 and a second curved section 17 that is not illustrated as a result of the section view. Moreover, the substantially straight sections 18 and 19 are illustrated which, in the illustrated embodiment, have no curvature. In analogy, the slantedly embodied second inner folded bellows also has a curved section 26 as well as a second curved section 27, not shown here, as well as a first substantially straight section 28 and a second substantially straight section 29. In case of the second filter bellows 20 shown here being slanted in the axial direction, the two substantially straight sections 28, 29 are also embodied without curvature. The two straight sections 28, 29 of the second filter bellows 20 are positioned relative to one another such that by means of the sealing element 51 at the first axial end 21 they are sealed relative to one another in such a way that a fine gas side and an unfiltered gas side are separated from one another in a leakage-proof way. Moreover, the shape-preserving shell 60 is designed such that it extends across the entire fold depth of the outer first folded bellows 10. However, it should be noted that the sealing element 51 can also extend across the entire fold depth of the second folded bellows while the shape-preserving shell 60 can extend only across a portion of the fold depth of the first folded bellows 10. At the second axial end 12 of the first filter bellows 10 as well as at the second axial end 22 of the second inwardly positioned filter bellows 20 in the illustrated embodiment a further sealing element 52 is provided that seals the filter bellows 10 relative to the second filter bellows 20 in a leakage-proof way so that a proper filtering function is ensured. In the embodiment illustrated in FIG. 4, the sealing element 52 extends across the entire fold depth of the outer filter bellows 10 as well as of the inner filter bellows 20. However it should be understood that the sealing element 51 can extend only partially across the fold depth of the first filter bellows 10 and only partially across the fold depth of the second filter bellows 20. The sealing element 51 as well as the sealing element 52 can be manufactured, for example, of polyurethane foam but also from any other material that is suitable for a seal. The folded bellows 10 can be supported relative to the folded bellows 20 by a support cage or support basket 85 so that the intake or outflow passage can be kept open even for a stronger air flow. For example, this basket 85 can be attached to the shape-preserving shell 60 so that together with the shape-preserving shell a supportive frame for the filter bellows 10 and 20 slanted toward one another results.

Figure 5:
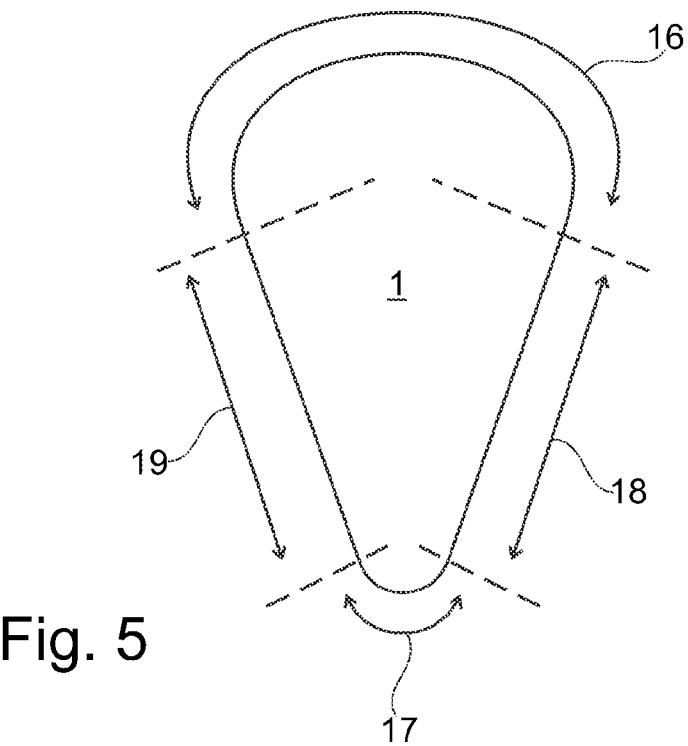
FIG. 5 shows a radial section of a circumferential geometry of a filter element according to an exemplary embodiment of the invention.

FIG. 5 shows a section view in a radial plane of a filter element according to an exemplary embodiment of the invention. In regard to the illustrated contour of the filter element 1 shown here, reference is being had only to the curved and the substantially straight sections relative to the first filter bellows 10, wherein the disclosure applies analogously to the inner folded bellows 20. FIG. 5 shows an embodiment in which the substantially straight sections 18, 19 are slanted relative to one another in a radial section plane. They connect the curved sections 16 and 17 with one another such that a closed contour results which is, for example, in the form of a pear or a drop. With such a slant of the substantially straight areas 18, 19, for example, an easier and simplified insertion into the air filter housing can be achieved. It is understood in this connection that the slant or inclined position illustrated in FIG. 5 extending in the radial plane is relatively pronounced. This slant or inclined position in an actual embodiment can be substantially smaller, in particular, when an optimized configuration of the filter element is concerned in which the slant is optimized relative to the remaining filter parameters. In this connection, the curved sections can pass substantially without a sharp bend into the straight sections 18, 19. Such an arrangement of substantially straight sections that are slanted toward one another is particularly relevant for radial force loading. With such a slanted arrangement it can be achieved that a counter sealing surface that is also slantedly arranged will contact or will be subjected to force loading only shortly before reaching the end position so that across wide areas a substantially transversely extending dragging movement of the two sliding surfaces against one another can be prevented. In this way, the service life of the sealing surfaces can be increased, in particular in case of a filter housing that in general has a substantially longer service life than a filter element 1 that is changed in regular intervals.

Figure 6:
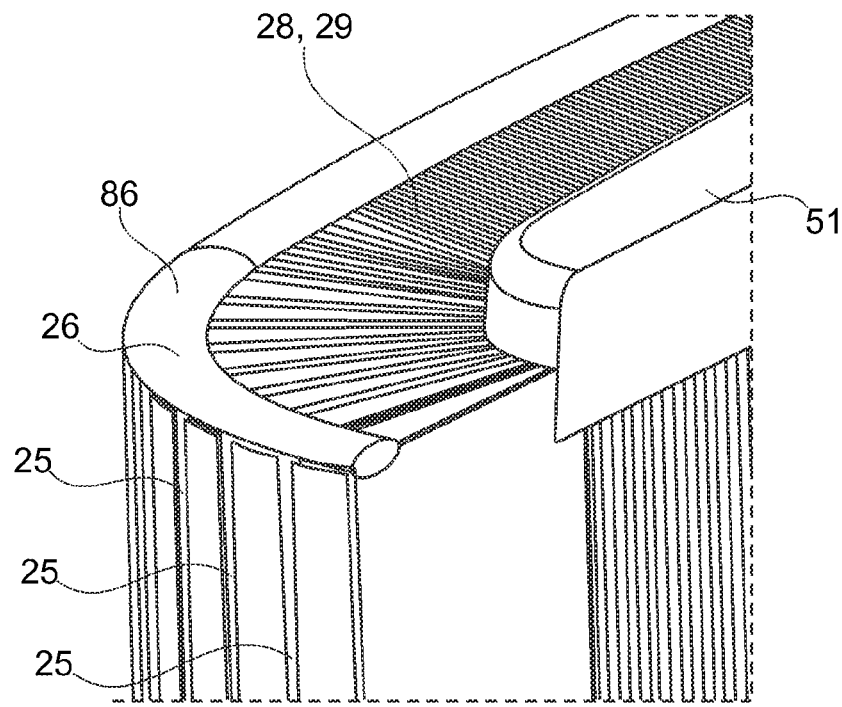
FIG. 6 shows a sealing and edge protection configuration of a filter element according to an exemplary embodiment of the invention.

FIG. 6 shows an exemplary embodiment of a second inner filter bellows. In this connection, adjacent to the sealing element 51 that connects seal-tightly the substantially straight sections 28, 29 with one another there is also a spacer or edge protection element 86 that in particular in the curved section 26 of the second folded bellows 20 keeps the filter folds 25 arranged in this area at a certain spacing to one another so that they cannot be pressed against one another and collapse in case of stronger air flow. This edge protection or spacer element 86 can be of the same material as the sealing element 51 and can be produced in the same manufacturing step. However, it is understood that the element 86 can also be comprised of a different material, in particular when the spacer and edge protection element 86 moreover is to assume the function of an impact or deformation protection device but should not have the spatial expansion as the sealing element 51. In particular, a hard adhesive in the form of a glue bead can be applied that in this case, for example, can have a greater hardness than the material of the sealing element 51.

Figure 7:
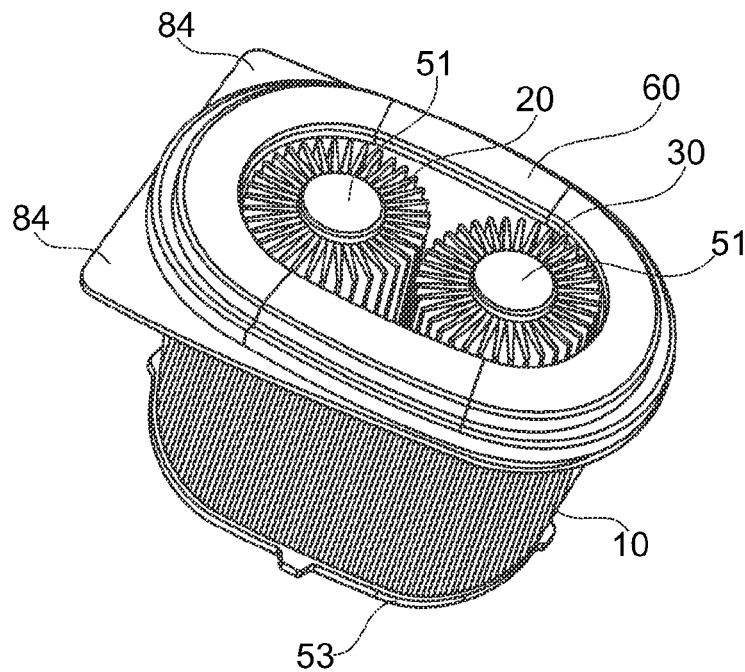
FIG. 7 shows a filter element according to a further exemplary embodiment of the invention.

FIG. 7 shows a further exemplary embodiment of a filter element in which within the outer first folded bellows 10 a second folded bellows 20 as well as a third folded bellows 30 are provided. The second folded bellows 20 and the third folded bellows 30 are positioned adjacent to one another and together inside the folded bellows 10. The folded bellows 10 can be covered also by a shape-preserving shell 60 at its first axial end so that, for example, a sealing configuration is made available as well as, for example, grips 84. The first sealing element 51 connects in this connection also the folds of the second folded bellows 20 and the folds of the third folded bellows 30 wherein, because of the circular shape of the folded bellows 20, 30, in this embodiment the opposite sides of the straight sections are no longer straight but the sealing element 51 is embodied as a sealing disk resting on the first axial end of the second folded bellows 20 and the third folded bellows 30. Moreover, a third sealing element 53 can be provided that seals the first folded bellows 10, on the one hand, and the second folded bellows 20 as well as the third folded bellows 30, on the other hand, relative to one another as will be described with reference to FIG. 8.

Figure 8:
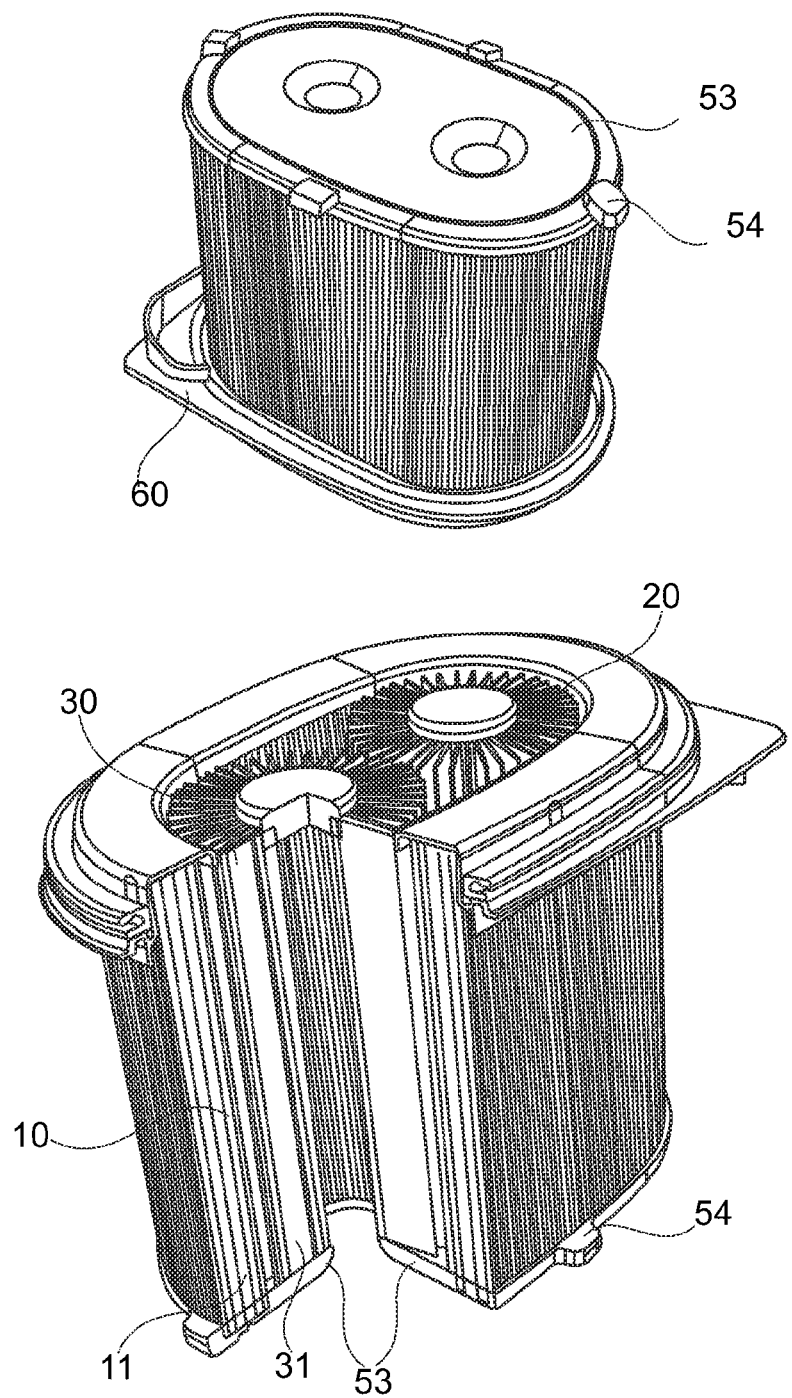
FIG. 8 shows a bottom view and a part-sectional view of a filter element according to an exemplary embodiment of the invention.

FIG. 8 shows a further view of the filter element illustrated in FIG. 7 in which within the first folded bellows 10 a second folded bellows 20 as well as a third folded bellows 30 extending parallel thereto are provided. On the first axial ends 11, 31 on an axial side opposite to the second axial ends a sealing element 53 is provided that connects in a leakage-proof way the first folded bellows 10, the second folded bellows 20 and the third folded bellows 30 with one another. The embodiment illustrated in FIG. 8 shows the sealing element 53 with an extension across the entire fold depth of the first folded bellows as well as the second and third folded bellows. However it is understood that the sealing element 53 can also extend only partially across the first folded bellows and only partially across the second and third folded bellows. In the embodiment illustrated in FIG. 8 the sealing element 53 as a result of its extension to the outer wall surface can also act as an impact protection device. Moreover, on this sealing element 53 spacers 54 can be provided in order to ensure a centering of the filter element 1 in an air filter housing. It is understood that also the other sealing elements, in particular the sealing element 52, can have such spacers 54 in order to ensure a centering of the filter element in an air filter housing 100.

It should be noted that the term "comprising" does not exclude additional elements; likewise the term "an" and "one" does not exclude several elements and steps. The employed reference numerals serve only for improving the understanding of the disclosure and are not be viewed as limiting wherein the protection sought for this invention is represented by the claims.

The invention claimed is:

1. Filter element for an air filter of an internal combustion engine, wherein the filter element comprises:
   a first filter bellows with filter folds extending substantially in an axial expansion direction of the filter element and a first fold depth that extends in a plane substantially orthogonal thereto in the radial expansion direction;
   a second filter bellows with filter folds extending substantially in an axial expansion direction of the filter element and a second fold depth that extends in a plane substantially orthogonal thereto in the radial expansion direction;
   wherein the second filter bellows is arranged radially inwardly relative to the first filter bellows;
   wherein a depth of the second filter folds is deeper than a depth of the corresponding first filter folds;
   a conical annular flow passage is formed between a radially outer surface of the second filter bellows and a facing radially inner surface of the first filter bellows;
   wherein the conical annular flow passage extends from a first axial end of the first and second filter bellows to an opposing second axial end of the first and second filter bellows;
   wherein the radially outer surface of the second filter bellows and the facing radially inner surface of the first filter bellows are spaced radially apart, the radial spacing forming the conical annular flow passage therebetween;
   wherein the conical annular flow passage widens radially in the axial expansion direction from the second axial end to the first axial end;
   wherein the first filter bellows at a first axial end is provided with a shell that is shape-preserving relative to an outer edge of the first filter bellows.

2. Filter element according to claim 1, wherein the depth of the second filter folds are deeper by the factor 1.1 to 2.5 than the depth of the corresponding first filter folds.

3. Filter element according to claim 1, wherein the filter folds of the second filter bellows relative to the filter folds of the first filter bellows are slanted at least section-wise the axial expansion direction.

4. Filter element according to claim 3, wherein a slant of the filter folds of the second filter bellows relative to the axial expansion direction is greater than a slant of the filter folds of the first filter bellows relative to the axial expansion direction.

5. Filter element according to claim 1, wherein the first filter bellows comprises in a plane of the radial expansion direction a first curved section and a second curved section with a first substantially straight section and a second substantially straight section that are intermediately positioned, respectively, such that the first and second curved sections as well as the first and second substantially straight sections form a closed oval circumferential contour.

6. Filter element according to claim 5, wherein the first substantially straight section and the second substantially straight section extend toward one another in the plane of the radial expansion direction.

7. Filter element according to claim 5, wherein the second filter bellows comprises in a plane of the radial expansion direction a first curved section and a second curved section with a first substantially straight section and a second substantially straight section intermediately positioned, respectively.

8. Filter element according to claim 7, wherein at a first axial end of the second filter bellows the first straight section and the second straight section are connected with one another by means of a first sealing element such that a filtered gas side and an unfiltered gas side of the second filter bellows are separated from one another in a leakage-proof way.

9. Filter element according to claim 8, wherein the first sealing element in a plane of the radial expansion direction extends only partially across the depth of the second filter folds of the second filter bellows.

10. Filter element according to claim 1, wherein the first filter bellows and the second filter bellows at a second axial end, respectively, are connected by a second sealing element such that the filtered gas sides and the unfiltered gas sides, respectively, of the first filter bellows and of the second filter bellows are separated from one another in a leakage-proof way.

11. Filter element according to claim 10, wherein the second sealing element extends in a plane of the radial expansion direction only partially across the depth of the first filter folds and the second filter folds.

12. Filter element according to claim 10, wherein the sealing element comprises PUR foam.

13. Filter element according to claim 1, wherein a filtered gas side of the first folded bellows faces a filtered gas side of the second folded bellows.

14. Filter element according to claim 1, wherein the first filter bellows has a first unfiltered gas side and a first filtered gas side and the second filter bellows has a second unfiltered gas side and a second filtered gas side, wherein the first filter bellows and the second filter bellows are connected to one another at an end face of the first filter bellows and an end face of the second filter bellows in a leakage-proof way such that either a first unfiltered gas side space corresponds to a second unfiltered gas side space or a first filtered gas side space corresponds to a second filtered gas side space.

15. Filter element according to claim 1, wherein
the filter element has
a first flow face at a first axial end of the filter element;
a second flow face at an opposing second axial end of the filter element;
wherein the first filter bellows and the second filter bellows extend axially from the first flow face to the second flow face.

* * * * *